(12) United States Patent
Rozmarynowski

(10) Patent No.: US 9,180,587 B2
(45) Date of Patent: Nov. 10, 2015

(54) NON-WELDING DEVICE POWERED BY A WELDING POWER SUPPLY

(75) Inventor: Scott Ryan Rozmarynowski, Greenville, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 874 days.

(21) Appl. No.: 13/248,801

(22) Filed: Sep. 29, 2011

(65) Prior Publication Data

US 2013/0081842 A1 Apr. 4, 2013

(51) Int. Cl.
| | | |
|---|---|---|
| *B25F 5/00* | (2006.01) | |
| *H02J 7/00* | (2006.01) | |
| *B23K 9/32* | (2006.01) | |
| *B23K 9/10* | (2006.01) | |

(52) U.S. Cl.
CPC .............. *B25F 5/00* (2013.01); *B23K 9/1006* (2013.01); *B23K 9/32* (2013.01); *H02J 7/0068* (2013.01)

(58) Field of Classification Search
CPC ...... B23K 9/1006; B23K 9/1043; B23K 9/32; B23K 9/327; F02B 63/04; B23P 23/00; H02J 9/005; H02J 7/0068; Y10T 307/615; H02M 7/003; H02M 2001/009

USPC .............. 219/137.2, 137.7, 130.1, 136, 133; 173/29, 217, 171; 451/357; 15/97.1
See application file for complete search history.

(56) References Cited

U.S. PATENT DOCUMENTS

| | | | | |
|---|---|---|---|---|
| 2,904,805 | A | * | 9/1959 | Dardig ........................... 15/97.1 |
| 4,376,250 | A | * | 3/1983 | Baker et al. .................... 307/150 |
| 5,206,967 | A | * | 5/1993 | Fushiya et al. ................. 15/97.1 |
| 5,289,605 | A | * | 3/1994 | Armbruster ..................... 15/97.1 |
| 6,066,834 | A | * | 5/2000 | Rebold ....................... 219/137.71 |
| 6,204,476 | B1 | * | 3/2001 | Reynolds et al. ......... 219/130.51 |
| 6,747,246 | B2 | * | 6/2004 | Crandell, III ............... 219/130.1 |
| 6,818,860 | B1 | * | 11/2004 | Stava et al. ................. 219/130.1 |
| 7,176,404 | B2 | * | 2/2007 | Herres ........................ 219/121.5 |
| 7,642,487 | B2 | * | 1/2010 | Silvestro ........................ 219/133 |
| 8,188,394 | B2 | * | 5/2012 | Mccormick et al. ........... 200/293 |
| 2006/0169685 | A1 | * | 8/2006 | Stanzel ....................... 219/137.31 |
| 2008/0264922 | A1 | * | 10/2008 | Fosbinder ....................... 219/133 |
| 2009/0277881 | A1 | * | 11/2009 | Bornemann et al. ....... 219/121.39 |
| 2010/0039792 | A1 | * | 2/2010 | Meyers et al. ................... 362/20 |

\* cited by examiner

*Primary Examiner* — Scott A. Smith
(74) *Attorney, Agent, or Firm* — Fletcher Yoder P.C.

(57) ABSTRACT

A non-welding device powered by a welding power supply is provided. One device, a power tool, includes a connector configured to be coupled to a trigger receptacle of a welding power supply and to receive power from the trigger receptacle. The power tool also includes control circuitry electrically coupled to the connector and configured to receive power from the welding power supply and to use the power to operate the power tool.

20 Claims, 3 Drawing Sheets

NON-WELDING DEVICE POWERED BY A WELDING POWER SUPPLY

BACKGROUND

The invention relates generally to welding power supplies and, more particularly, to a non-welding device powered by a welding power supply.

Portable welding systems may be used for a variety of applications including field applications where it is not practical or convenient to send a work piece to a welding shop for repair or fabrication. As such, the portable welders may be taken to the weld site to perform welding operations. These welders find applications in the farming and ranching industry; off-road applications; food and beverage industry; restaurant and kitchen repair; petroleum and chemical fabrication; shipboard installation and repair; and many other maintenance and repair applications.

In addition to welding, an operator may desire to use a power tool, such as a grinder, when performing a welding operation using the portable welding system. Unfortunately, such a power tool often requires power that is unavailable at the welding location (e.g., the power tool may require 115 VAC). Therefore, the operator either cannot use the power tools or the operator has to find some way to bring 115 VAC to the welding location. Accordingly, there exists a need for power tools that can be powered by power from a portable welding system so the power tools can be operated, such as when the operator is welding in remote locations.

BRIEF DESCRIPTION

In one embodiment, a power tool includes a connector configured to be coupled to a trigger receptacle of a welding power supply and to receive power from the trigger receptacle. The power tool also includes control circuitry electrically coupled to the connector and configured to receive power from the welding power supply and to use the power to operate the power tool.

In another embodiment, a welding system includes a welding power supply having a weld power receptacle and a trigger receptacle. The weld power receptacle is configured to provide welding power to a welding torch. The trigger receptacle is configured to be coupled to a trigger of the welding torch and to provide power to operate a wire drive system coupled to the welding torch. The welding system also includes a power tool configured to be coupled to the trigger receptacle and to receive power from the trigger receptacle.

In another embodiment, a grinder includes a connector configured to be coupled to a low voltage direct current power source and to receive power from the power source. The grinder also includes control circuitry electrically coupled to the connector and configured to receive power from the power source and to use the power to operate the grinder.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
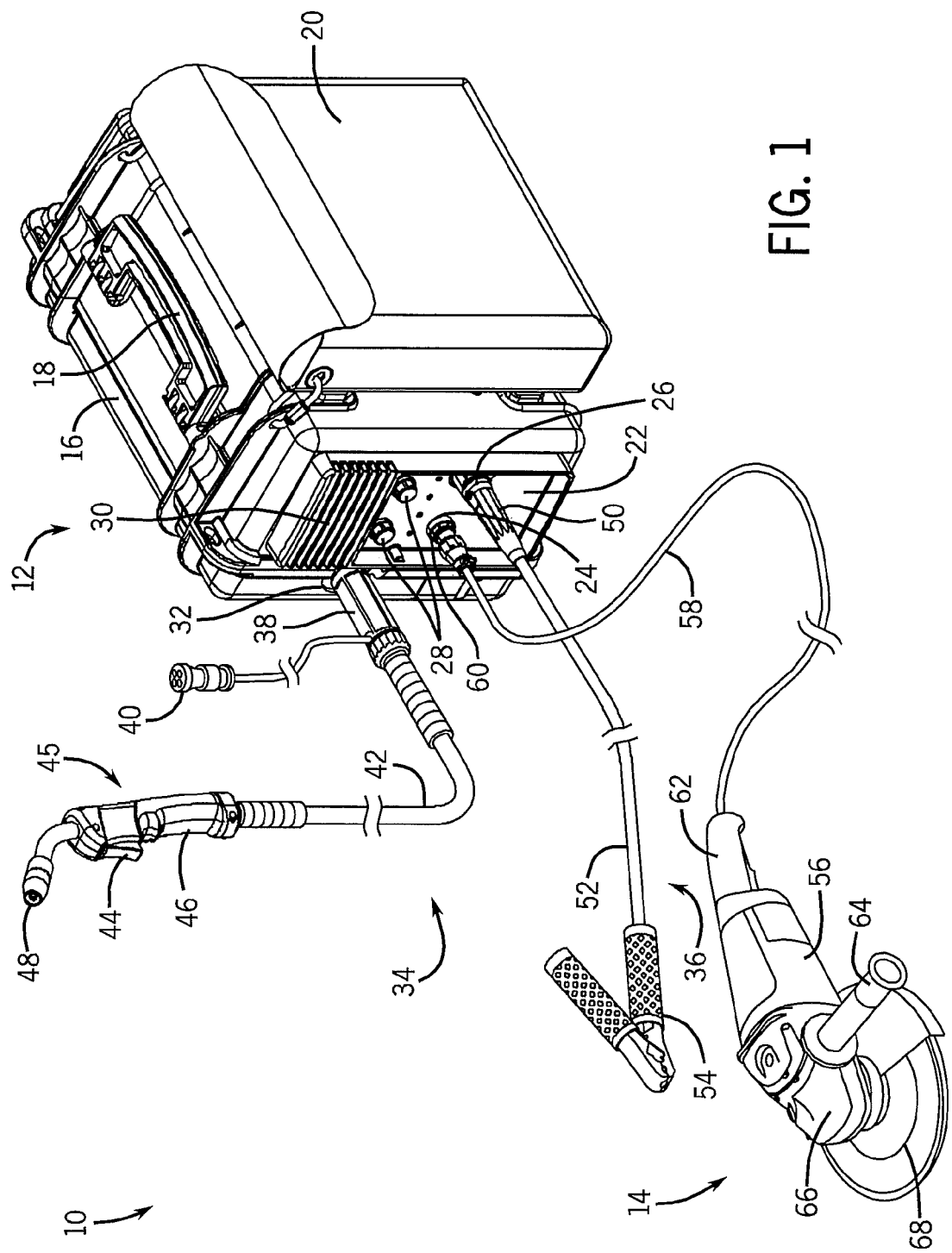
FIG. 1 is a perspective view of an embodiment of a welding system with a power tool being powered by a portable welding power supply.

Turning now to the drawings and referring first to FIG. 1, an embodiment of a welding system 10 is illustrated. The welding system 10 includes a welding power supply 12, such as portable battery-powered welder, and a power tool 14, such as a grinder. The welding power supply 12 includes a case 16 that houses internal components (e.g., power conversion circuitry, control circuitry, batteries, etc.) and allows the welding power supply 12 to be easily transported. As may be appreciated, the case 16 may be made from a light weight, impact resistant, and flame retardant material, for example, a polymer. The case is not limited to this type of material and may also be made, in whole or in part, from other structural materials, such as metal alloys or composite material.

The welding power supply 12 includes a handle 18 for carrying the welding power supply 12 and a pouch 20 that may hold various welding system 10 components (e.g., torch, cables, etc.). The welding power supply 12 has a front panel 22 that provides an interface for the power supply 12 to enable an operator to control welding processes, etc. The front panel 22 also includes receptacles for connecting cables to the welding power supply 12. Specifically, the front panel 22 includes a trigger receptacle 24 and a work cable receptacle 26. The front panel 22 also includes a user interface 28 which provides information to an operator and allows the operator to alter various power supply 12 settings. For example, the user interface 28 may include knobs, buttons, dials, displays, and so forth for. Additionally, a front louver 30 may be integrated into the case 16 as part of a cooling system incorporated into the welding power supply 12 to dissipate heat from internal electronic components.

A weld torch receptacle 32 is located adjacent to the front panel 22 and allows a weld torch assembly 34 to be connected to the receptacle 32. Welding power for a welding operation is provided through the receptacle 32. Further, a work cable assembly 36 is connected to the work cable receptacle 26. The work cable assembly 36 provides an electrical connection between the welding power supply 12 and a workpiece. Transitioning to the weld torch assembly 34, the weld torch assembly 34 includes a welding power connector 38 and a torch trigger connector 40. Specifically, the welding power connector 38 couples the weld torch assembly 34 to the weld torch receptacle 32. Although the torch trigger connector 40 is illustrated as not being connected to anything, the torch trigger connector 40 is configured to be coupled to the trigger receptacle 24.

Generally, welding power flows from the welding power supply 12 to the weld torch assembly 34 through the welding power connector 38. The torch trigger connector 40 includes a switched connection to provide low voltage power (e.g., 12 or 24 VDC) to operate a wire drive system to feed wire from a spool that may be part of the weld torch assembly 34. In addition, the torch trigger connector 40 includes electrical conductors (e.g., wires) that extend from the connector 40 and through a weld cable 42 to a trigger 44 of a torch 45. These electrical conductors are configured to provide an indication to the welding power supply 12 of when the trigger 44 is pressed.

As may be appreciated, welding power flows through the weld cable 42 to the torch 45. The torch 45 includes a handle 46 for the operator to hold while performing a welding operation. When the welding operator presses the trigger 44, an electric arc is formed between a tip 48 of the torch 45 and the workpiece. Moving to the work cable assembly 36, the work cable assembly 36 includes a work cable connector 50 that is connected to the work cable receptacle 26. A work cable 52 extends from the connector 50 to a work clamp 54. The work clamp 54 is connected to the workpiece so that the welding arc may be formed between the torch 45 and the workpiece.

The power tool 14 (e.g., a grinder 56) receives power from the trigger receptacle 24. It should be noted that the power tool 14 may be any power tool that is configured to connect to the trigger receptacle 24 and to receive power from the trigger receptacle 24. Specifically, a cable 58 connects the grinder 56 to a power tool connector assembly 60. The power tool connector assembly 60 is directly coupled to the trigger receptacle 24. As may be appreciated, the grinder 56 includes a rear handle 62 and a side handle 64. These handles 62 and 64 are used by the operator to move the grinder 56 and to apply pressure for grinding. It should be noted that certain grinders 56 may have fewer or more handles and the handles may be in different locations than illustrated. The grinder 56 also includes a housing 66 that encloses various components, such as control circuitry, motors, etc. Further, the grinder 56 has a grinding portion 68 that is coupled to a motor within the housing 66.

As shown in FIG. 1, the connector 40 is disconnected from the welding power supply 12 when the connector assembly 60 is connected to the trigger receptacle 24. Likewise, when the connector assembly 60 is disconnected from the welding power supply 12, the connector 40 may be connected to the trigger receptacle 24. Further, when any suitable power tool 14 is connected to the trigger receptacle 24, the power tool 14 may receive power from the welding power supply 12 for operating the power tool 14. Thus, an operator may have flexibility to use various power tools 14 when using the welding power supply 12 in remote locations, such as where an alternate power source for the power tools 14 is unavailable.

Figure 2:
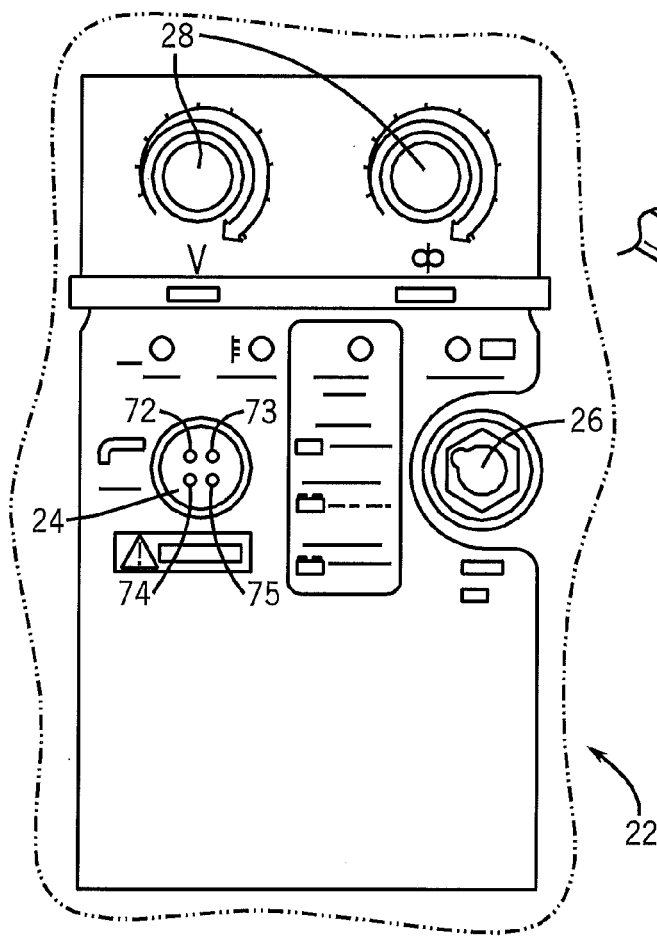
FIG. 2 is a close-up view of an embodiment of a front panel of the portable welding power supply of FIG. 1.

FIG. 2 is a close-up view the front panel 22 of the portable welding power supply 12 of FIG. 1. As illustrated, the trigger receptacle 24 includes four conductors. Specifically, the trigger receptacle 24 includes a first socket 72, a second socket 73, a third socket 74, and a fourth socket 75. As may be appreciated, when either connector 40 or connector assembly 60 is coupled to the trigger receptacle 24, the pins from the connectors 40 and 60 make electrical contact with the sockets 72, 73, 74, and 75. Thus, a low voltage (e.g., 12 VDC or 24 VDC) power may flow from the welding power supply 12, through the trigger receptacle 24 to the power tool 14 or the torch 45.

Figure 3:
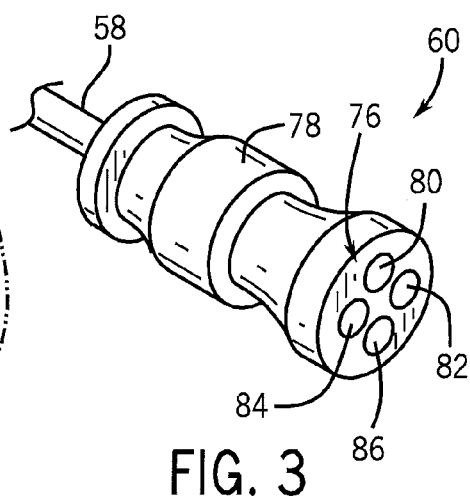
FIG. 3 is a perspective view of an embodiment of a connector assembly of a power tool that may be connected to the portable welding power supply of FIG. 1.

FIG. 3 is a perspective view of the power tool connector assembly 60 that may be connected to the portable welding power supply 12 of FIG. 1. The connector assembly 60 includes a connector 76 coupled to a backshell 78. The cable 58 extends from the backshell 78. Specifically, the connector 76 includes four pins that are configured to mate with the sockets 72, 73, 74, and 75 of FIG. 2. In particular, a first pin 80 (i.e., pin 1), a second pin 82 (i.e., pin 2), a third pin 84 (i.e., pin 3), and a fourth pin 86 (i.e., pin 4). Each of the pins 80, 82, 84, and 86 are connected to wires that extend through the backshell 78 to the cable 58. The backshell 78 provides support to the wires extending from the connector 76 to the cable 58 and helps the wires stay electrically connected to the pins 80, 82, 84, and 86. It should be noted that when the connector assembly 60 mates with the trigger receptacle 24, the first pin 80 is inserted into the first socket 72, the second pin 82 is inserted into the second socket 73, the third pin 84 is inserted into the third socket 74, and the fourth pin 86 is inserted into the fourth socket 75.

Figure 4:
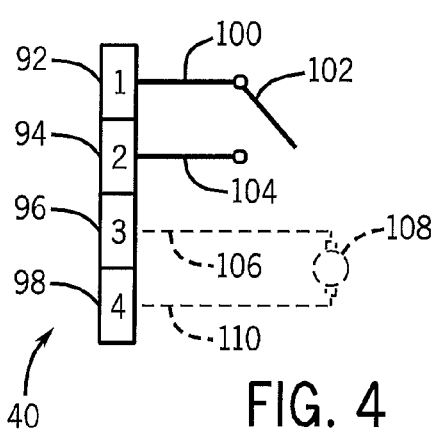
FIG. 4 is a schematic diagram of an embodiment of the torch connector of FIG. 1.

FIG. 4 is a schematic diagram illustrating how pins of the torch connector 40 may be connected to the torch 45. Specifically, the connector 40 may have four pins, a first pin 92 (i.e., pin 1), a second pin 94 (i.e., pin 2), a third pin 96 (i.e., pin 3), and a fourth pin 98 (i.e., pin 4). When the connector 40 mates with the trigger receptacle 24, the first pin 92 is inserted into the first socket 72, the second pin 94 is inserted into the second socket 73, the third pin 96 is inserted into the third socket 74, and the fourth pin 98 is inserted into the fourth socket 75. A first wire 100 (or conductor) extends from the first pin 92 through the cable 42 to the trigger 44 of the torch 45. A switch 102 is connected between the first wire 100 and a second wire 104. The switch 102 is configured to be in an open position when the trigger 44 is not pressed and in a closed position when the trigger 44 is pressed. The second wire 104 connects the switch 102 to the second pin 94. Thus, an electric current may flow between the first pin 92 and the second pin 94 when the trigger 44 is pressed, but the electric current is inhibited from flowing when between the first pin 92 and the second pin 94 when the trigger 44 is not pressed. When the connector 40 is connected to the welding power supply 12 of FIG. 1, the power supply 12 is configured to sense when the trigger 44 is pressed. When the trigger 44 is pressed, the power supply 12 provides welding power to the torch 45. In certain welding torches, such as the welding torch 34 illustrated in FIG. 1, the welding torch may be a metal inert gas (MIG) torch. In such torches, the third pin 96 and the fourth pin 98 are not used.

As may be appreciated, certain welding torches may include a wire drive system. In such torches, the third pin 96 and the fourth pin 98 are used for powering the wire drive system. For example, a third wire 106 may extend from the third pin 96 to a motor 108. The motor 108 may also connected to a fourth wire 110 that extends to the fourth pin 98. The welding power supply 12 provides power to the pins 96 and 98 when the pins 96 and 98 are connected to the sockets 74 and 75 of the trigger receptacle 24. In certain embodiments, the power supply 12 only provides power to the sockets 74 and 75 when the trigger 44 is pressed (e.g., the switch 102 is in the closed position to connect wires 100 and 104), however, in other embodiments, the power supply 12 may provide power to the sockets 74 and 75 even when the trigger 44 is not pressed. As may be appreciated, the motor 108 may be a motor for the wire drive system that is coupled to the torch 45, or some other motor. Further, it should be noted that the welding power supply 12 is configured to provide a low DC voltage to sockets 74 and 75 of the trigger receptacle 24. For example, the welding power supply 12 may provide 12 VDC or 24 VDC to the sockets 74 and 75.

Figure 5:
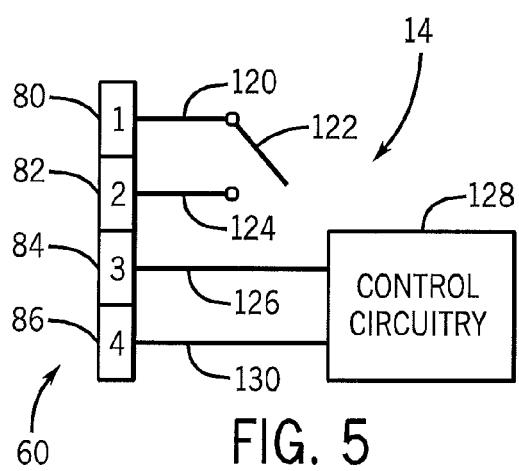
FIG. 5 is a schematic diagram of an embodiment of the power tool connector assembly of FIG. 1.

Power tools 14 that are adapted to use power from the trigger receptacle 24 may be connected to the trigger receptacle 24 in the place of the weld torch assembly 34. Specifically, if connector 40 is connected to the trigger receptacle 24, the connector 40 may be removed from the trigger receptacle 24 and the power tool connector assembly 60 may be connected to the trigger receptacle 24. The power tool 14 may then be used instead of the torch 45. FIG. 5 illustrates a schematic diagram of the power tool connector assembly 60 that may be used to facilitate the operation of the power tool 14. In particular, a first wire 120 connects the first pin 80 to a switch 122 and the switch 122 connects the first wire 120 to a second wire 124. Further, the second wire 124 connects the switch 122 to the second pin 82. Thus, an electric current may flow between the first pin 80 and the second pin 82 when the switch 122 is closed (e.g., when a trigger of a power tool is pressed), but the electric current is inhibited from flowing when between the first pin 80 and the second pin 82 when the switch 122 is open (e.g., when the trigger of the power tool is not pressed). When the connector 60 is connected to the welding power supply 12 of FIG. 1, the power supply 12 is configured to sense when the switch 122 is closed. When the switch 122 is closed, the power supply 12 provides welding power to the third and fourth pins 84 and 86. In certain embodiments, the switch 122 may be replaced with a wire and may cause the welding power supply 12 to continually provide power across sockets 74 and 75 of the trigger receptacle 24 (e.g., it would appear to the welding power supply 12 that the switch 122 is always closed).

A third wire 126 couples the third pin 84 to control circuitry 128 of the power tool 14. Likewise, a fourth wire 130 couples the fourth pin 86 to the control circuitry 128. Therefore, the control circuitry 128 receives power applied across the third and fourth pins 84 and 86. As such, when the connector assembly 60 is connected to the trigger receptacle 24 and the switch 122 is closed, power from the welding power supply 12 will be provided to the control circuitry 128. The control circuitry 128 controls the operation of the power tool 14 and uses the power provided across the third and fourth wires 126 and 130 to power the power tool 14. In certain embodiments, the control circuitry 128 may be a motor of the power tool 14. Because the first pin 80 is electrically connected to the second pin 82 while the switch 122 is closed, power will be provided to the control circuitry 128 as soon as the power tool 14 is connected to the trigger receptacle 24 and the switch 122 is closed. Thus, the power tool 14 can be connected to the welding power supply 12 and immediately used by the operator. In certain embodiments, the control circuitry 128 may include controls for operating the power tool 14.

Figure 6:
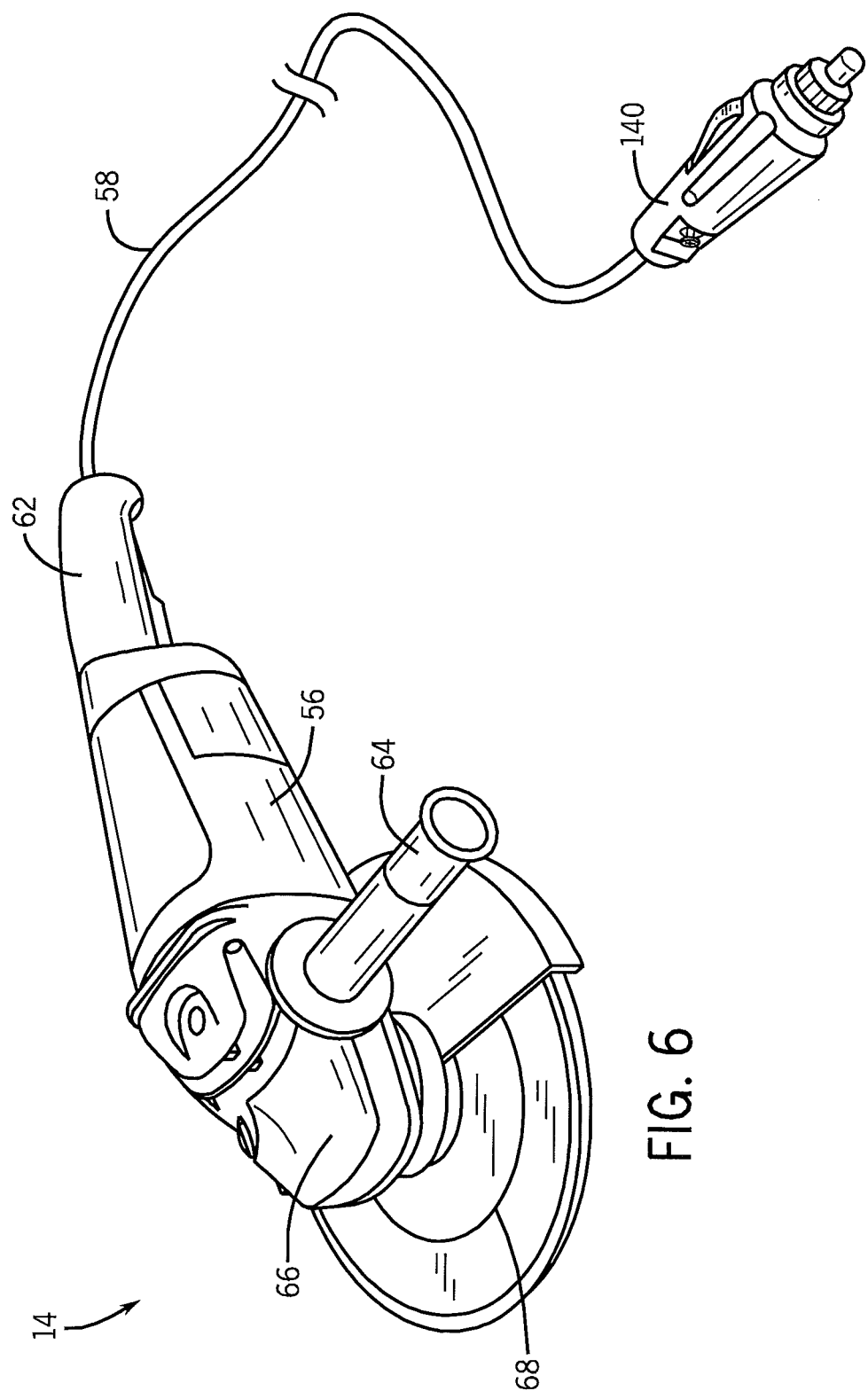
FIG. 6 is a perspective view of an embodiment of a grinder with a cigarette lighter connector.

As may be appreciated, certain power tools 14 may be adapted in other ways so the power tools 14 can be used in remote locations. For example, FIG. 6 illustrates a perspective view of the power tool 14 (e.g., the grinder 56) adapted to be powered from a cigarette lighter. As illustrated, the cable 58 connects the grinder 56 to a cigarette lighter connector 140. Thus, the grinder 56 may be connected to and receive power from a cigarette lighter. Similar to the grinder 56 of FIG. 1, this grinder 56 is adapted to use a low voltage DC power (e.g., 12 VDC or 24 VDC) so that it will operate when connected to the cigarette lighter. As may be appreciated, other power tools 14 may be similarly adapted to operate using power from a cigarette lighter. The power tool 14, as illustrated, includes a direct connection between the grinder 56 and the cigarette lighter connector 140. In such a configuration, the cable 58 may only include power conductors extending from the connector 140 to the grinder 56. As such, control circuitry within the grinder 56 may determine when to utilize the power provided to the grinder 56. For example, the control circuitry may only utilize the power when a grinder 56 trigger is pressed. In certain configurations, the power tool 14 of FIG. 1 may be connected to a cigarette lighter by using an adaptor cable. For example, an adaptor cable may have a first connector to mate with connector 60 and a second connector to mate with a cigarette lighter. The adaptor cable would be connected between the power tool 14 and the cigarette lighter. As may be appreciated, such an adaptor cable may include power wiring from the cigarette lighter to the connector 60. Further, pins 80 and 82 would be unused, and the control circuitry 128 would be used to determine when to utilize power provided to the power tool 14. Although the connectors and receptacles described herein have specified either pins or sockets as their conductive elements, it should be noted that the conductive elements may be either pins or sockets.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power tool comprising:
   a connector assembly comprising a connector configured to be coupled to a welding torch trigger receptacle of a welding power supply and to receive power from the welding torch trigger receptacle, the connector assembly having power conductors that in operation receive DC power from a power source, and signal conductors coupled to a trigger of the power tool and configured to convey a trigger signal to the welding power supply to trigger receipt of the DC power from the power source; and
   control circuitry electrically coupled to the connector and configured to receive power from the welding power supply for powering the power tool.

2. The power tool of claim 1, wherein the power tool comprises a grinder.

3. The power tool of claim 1, wherein the power tool is configured to operate using 12 volt direct current power.

4. The power tool of claim 1, wherein the power tool is configured to operate using 24 volt direct current power.

5. The power tool of claim 1, comprising a motor configured to operate using the power from the welding torch trigger receptacle.

6. The power tool of claim 1, wherein the connector assembly comprises:
   a backshell coupled to the connector; and
   a cable coupled to the backshell, wherein the cable comprises the power conductors and the signal conductors.

7. The power tool of claim 1, wherein the control circuitry is configured to control the power tool and use power received by the power conductors to power the power tool.

8. The power tool of claim 1, comprising a switch coupled to the signal conductors and the trigger.

9. The power tool of claim 8, wherein the switch is configured to be open when the trigger is not depressed and close when the trigger is depressed.

10. The power tool of claim 9, wherein the power tool only draws power from the welding torch trigger receptacle when the switch is closed.

11. A grinder comprising:
    a connector assembly comprising:
       a connector configured to be coupled to a welding torch trigger receptacle of a welding power supply and to receive power from the welding torch trigger receptacle of the welding power supply, the connector assembly having power conductors that in operation receive DC power from a power source, and signal conductors coupled to a trigger of a power tool and configured to convey a trigger signal to the welding power supply to trigger receipt of the DC power from the power source;
       a backshell coupled to the connector; and
       a cable coupled to the backshell, wherein the cable comprises the power conductors and the signal conductors; and control circuitry electrically coupled to the connector and configured to provide the trigger signal and to receive power from the welding torch trigger receptacle of the welding power supply for powering the grinder.

12. The grinder of claim 11, wherein the grinder is configured to operate using 12 volt direct current power supplied by the welding torch trigger receptacle.

13. The grinder of claim 11, wherein the grinder is configured to operate using 24 volt direct current power supplied by the welding torch trigger receptacle.

14. The grinder of claim 11, wherein the control circuitry is configured to control the grinder and use power received by the power conductors to power the grinder.

15. The grinder of claim 11, comprising a switch coupled to the signal conductors.

16. The grinder of claim 15, wherein the switch is configured to be open when the trigger is not depressed and close when the trigger is depressed.

17. The grinder of claim 16, wherein the grinder only draws power from the welding torch trigger receptacle when the switch is closed.

18. A connector assembly of a grinder comprising:
a connector configured to be coupled to a welding torch trigger receptacle of a welding power supply and to receive power from the welding torch trigger receptacle;
power conductors that in operation receive DC power from the welding power supply;
signal conductors coupled to a trigger of the grinder and configured to convey a trigger signal to the welding power supply to trigger receipt of the DC power from the welding power supply;
a backshell coupled to the connector; and
a cable coupled to the backshell wherein the cable comprises the power conductors and the signal conductors.

19. The connector assembly of claim 18, wherein the grinder is configured to operate using 12 volt direct current power supplied by the welding torch trigger receptacle.

20. The connector assembly of claim 18, wherein the grinder only draws power from the welding torch trigger receptacle when a switch is closed.

\* \* \* \* \*